US 7,019,683 B2

(12) United States Patent
Stevens et al.

(10) Patent No.: US 7,019,683 B2
(45) Date of Patent: Mar. 28, 2006

(54) SHIPPING CONTAINER SECURITY SYSTEM

(75) Inventors: James E. Stevens, Mahtomedi, MN (US); Frederick W. Eggers, Wilsonville, OR (US); Feng Tang, Tualatin, OR (US); Niall Creedon, Tigard, OR (US); Douglas H. Marman, Ridgefield, WA (US)

(73) Assignee: General Electric Company, Schenactady, NY (US)

( * ) Notice: Subject to any disclaimer, the term of this patent is extended or adjusted under 35 U.S.C. 154(b) by 21 days.

(21) Appl. No.: 10/794,764

(22) Filed: Mar. 5, 2004

(65) Prior Publication Data
US 2005/0195101 A1    Sep. 8, 2005

(51) Int. Cl.
*G01S 13/04* (2006.01)
*G01S 13/88* (2006.01)

(52) U.S. Cl. .............................. 342/28; 342/27; 342/52; 342/58; 342/60; 342/134; 342/137; 342/175; 342/195

(58) Field of Classification Search .................. 342/21, 342/22, 27, 28, 52–60, 89–103, 118, 134–145, 342/175, 192–197; 367/93, 94, 97; 340/540, 340/541, 552–557, 825.49, 539.1, 539.22–539.25, 340/568.1, 571–572.9, 825.25, 5.1, 5.2, 5.3, 340/5.33
See application file for complete search history.

(56) References Cited

U.S. PATENT DOCUMENTS

| | | | | |
|---|---|---|---|---|
| 3,634,884 A | * | 1/1972 | Ross ............................ 342/28 |
| 3,739,325 A | * | 6/1973 | Ludwig ........................ 367/97 |
| 3,961,323 A | * | 6/1976 | Hartkorn ................. 340/539.1 |
| 4,016,529 A | * | 4/1977 | Inuzuka et al. ............... 367/93 |
| 4,242,743 A | * | 12/1980 | Salem ......................... 367/93 |
| 4,347,590 A | * | 8/1982 | Heger et al. .................. 367/93 |
| 4,639,902 A | * | 1/1987 | Leverance et al. ............ 367/93 |
| 4,651,157 A | * | 3/1987 | Gray et al. ............... 340/539.1 |
| 4,688,244 A | * | 8/1987 | Hannon et al. ......... 340/825.25 |
| 4,750,197 A | * | 6/1988 | Denekamp et al. ........ 340/5.33 |
| 4,903,009 A | * | 2/1990 | D'Ambrosia et al. ....... 340/556 |
| 4,949,074 A | * | 8/1990 | D'Ambrosia et al. ....... 340/552 |
| 5,491,486 A | | 2/1996 | Welles, II et al. |
| 5,648,763 A | * | 7/1997 | Long ..................... 340/825.49 |

(Continued)

OTHER PUBLICATIONS

"Universal Fire Transmitter (UFT)", GE Interlogix Product Information, © 2002, GE Interlogix, Saint Paul, MN.

*Primary Examiner*—Bernarr E. Gregory
(74) *Attorney, Agent, or Firm*—Klarquist Sparkman, LLP

(57) ABSTRACT

A security system senses intrusions into a shipping container through the opening of doors, cutting an opening, or removing the doors from their hinges. Intrusion information is transmitted to a remote receiver without interrogation, thereby reducing power consumption. Sensing is accomplished by employing a range-gated micro-impulse radar ("RGR") that generates microwave pulses that bounce around the interior of the container. The RGR includes a range gate that enables measuring reflected signals during the time gate period that is set for the time it takes a pulse to propagate a maximum distance within the container and reflect back. A direct current signal level is produced that represents the average reflected signal level within the container, and a Doppler shift measurement is made that represents motion inside the container. The signals are conveyed to the transmitter for conveyance to the remote receiver.

25 Claims, 4 Drawing Sheets

U.S. PATENT DOCUMENTS

| | | | |
|---|---|---|---|
| 5,969,595 A * | 10/1999 | Schipper et al. | 340/539.1 |
| 6,239,736 B1 * | 5/2001 | McDonald et al. | 342/28 |
| 6,281,797 B1 * | 8/2001 | Forster et al. | 340/572.1 |
| 6,437,702 B1 * | 8/2002 | Ragland et al. | 367/93 |
| 6,614,349 B1 * | 9/2003 | Proctor et al. | 340/825.49 |
| 6,870,476 B1 * | 3/2005 | Cockburn et al. | 340/539.22 |

* cited by examiner

SHIPPING CONTAINER SECURITY SYSTEM

RELATED APPLICATIONS

Not applicable

FEDERALLY SPONSORED RESEARCH OR DEVELOPMENT

Not applicable

TECHNICAL FIELD

This invention relates to intrusion monitoring security systems and more particularly to a shipping container security system employing a range-gated radar-based presence and motion detector.

BACKGROUND OF THE INVENTION

It has long been desired to provide reliable, inexpensive security monitoring for shipping containers, especially those used in international shipping. Recently, security concerns have heightened considerably, and the need for preventing weapons of mass destruction, explosives, drugs and other contraband from entering ports or other border crossings has become urgent. Of course, it is also a goal to prevent the theft of goods during shipping.

Prior workers have employed container door seals to detect tampering. Some have employed electronic seals to store information whenever the container doors are opened. Wireless, battery-operated systems have also been employed to communicate the stored data to readers at ports of entry. However, such seal systems fall short of the needs. For example, thieves can defeat seals by removing the container doors from their hinges, and prior wireless systems typically employ high-current consuming two-way communications requiring frequent battery replacement.

Other sensing technologies have also been employed in the past. For example, passive Infrared ("PIR") sensors can detect warm bodies in the containers if the bodies have a sufficiently different emissive temperature from the background emissive temperature. However, the interior areas of shipping containers are often hot, which condition can cause failure to detect intrusion by a human being. Also, because the containers are subject to external heating, PIRs can falsely indicate the presence of a human being. Moreover, PIRs can easily be blocked by the contents of the container or by dirt, thus shielding the field of view of the PIRs from a human being attempting entry through a hole in a side of the container. In worst case situations, contents or dirt can even block detection of entry through the container doors.

Ultrasonic motion sensors have also been employed within shipping containers. However, they are even more prone to deterioration caused by dirt, moisture, and heat. As with PIRs, dirt and moisture can cause sensitivity deterioration. However, with ultrasonic sensors, heat radiated into the container from the container walls creates heat waves that can reflect ultrasonic energy and thereby cause false alarms.

SUMMARY OF THE INVENTION

An object of this invention is, therefore, to provide a shipping container security system that provides a sensor for detecting any entry into a filled container.

Another object of this invention is to provide a shipping container security system that includes a wireless reporting system having long battery life.

Yet another object of this invention is to provide a shipping container security system that overcomes the disadvantages of the prior art.

A security system of this invention senses intrusions into a shipping container through the opening of doors, cutting an opening, or removing the doors from its hinges. The security system communicates intrusion information to a remote receiver without interrogation, thereby reducing power consumption. Sensing is accomplished by employing a range-gated micro-impulse radar ("RGR") that generates very low power, wide-band, short duration microwave pulses that bounce around the interior of the container. The RGR includes a range gate that enables measuring reflected signals during a time gate period, which is preferably set for the time it takes a pulse to propagate a maximum distance within the container and reflect back.

Two measurements are made: First, a DC (direct current) signal level is produced that represents an average reflected signal level within the container, and second, a Doppler shift measurement is made that represents motion inside the container. The signals are conveyed to a transmitter, which communicates with a remote receiver.

Employing microwave energy for sensing is superior to other methods, such as merely sensing door openings, because changes in the container walls and contents can be detected. Moreover, dirt, temperature extremes, humidity, physical shock, and contents blocking the microwave pulses will not prevent the RGR from working.

The security system may further include a switch for detecting whether the container door is open, which status is useful for confirming whether a breach is detected. The switch can also help determine how long the doors remain open, and sends this information to the transmitter for communication to the remote receiver along with signal data from the RGR.

The security system is battery powered and includes techniques for reducing current consumption. A technique for reducing current consumption entails operating the security system with a pulsed duty cycle that activates the RGR for a short time period to measure the DC level and/or Doppler shift signals. If no signal change is detected, then the RGR is deactivated. After a relatively long time period, the RGR is reactivated to make another measurement. If a signal change is detected, then the RGR stays activated for a time sufficient for making multiple measurements of the DC level and/or Doppler shift signals.

Another technique for reducing current consumption further employs a sensor to activate the RGR whenever significant motion of the container is detected.

In this invention, the transmitter sends data reports including the total number of container intrusions, a time stamp representing the current time of the data report, and relative time stamps of prior intrusions. The intrusion information is provided by the RGR and by the door switch. The intrusion time stamps are preferably relative measures of the elapsed time, which eliminates the need for a costly precision time clock in the security system.

The remote receiver compares the data received from the security system at a current time to data received at a shipping time. If the total number of intrusions has not changed, then the integrity of the container has been maintained.

Another benefit of intrusion time stamps is automatic verification that intrusion sensing capability has not been defeated. Whenever the container is opened, if the total intrusion counter does not register an incremental count, then the intrusion sensing capability has either failed or been intentionally defeated.

The functionality of the security system can be expanded by adding an optional global positioning system ("GPS") receiver for associating location information with the intrusion time stamps and reporting these data from the transmitter to the remote receiver.

The security system can further optionally include a long-range wireless modem for conveying data reports via satellite, cellular radio channels, two-way pager networks, or other regional or global wireless networks.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
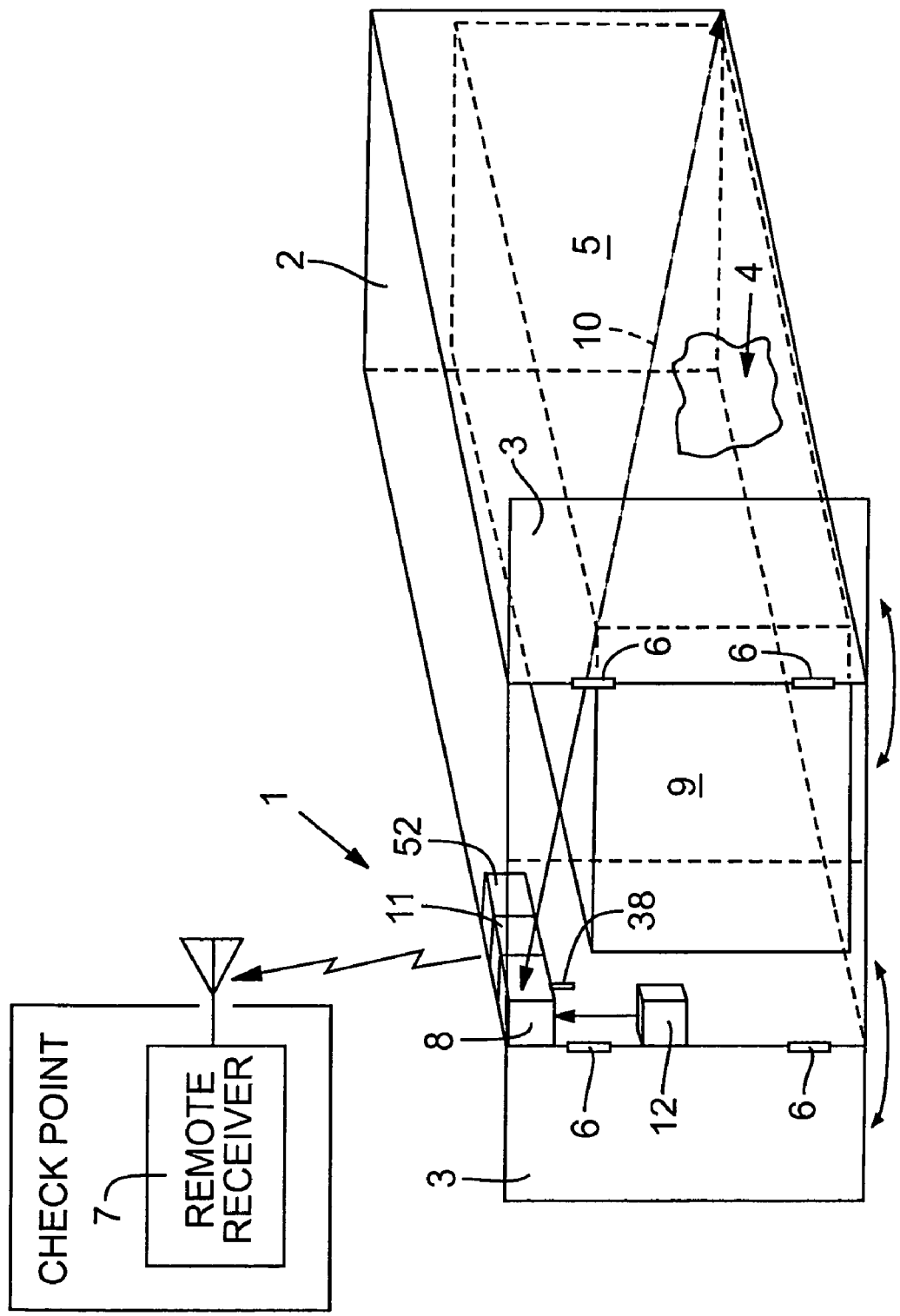
FIG. 1 is a simplified isometric pictorial view of a shipping container employing a security system of this invention.

FIG. 1 shows a security system 1 of this invention that senses intrusions into a shipping container 2 through more than just the opening of doors 3 (shown open in solid lines, and shut in dashed lines). Security system 1 can also determine whether shipping container 2 has been breached by cutting an opening 4 in a surface (including any of ends, walls, top, bottom, and doors), such as one of sides 5 of container 2, or if one of doors 3 have been removed from hinges 6. Security system 1 preferably communicates this intrusion information to a remote receiver 7 without interrogation, thereby reducing power consumption within security system 1. Any breach sufficiently large to allow access to shipping container 2 can be sensed by security system 1 and reported to receiver 7. The sensing is accomplished by employing at least a range-gated micro-impulse radar ("RGR") 8, which is described with reference to FIGS. 2, 3, and 4.

RGR 8 produces very low power, wide-band, short duration pulses in the microwave frequency range. Ultra-wideband pulses can also be used in the microwave frequency range. These pulses are transmitted from RGR 8 into the interior of shipping container 2. RGR 8 is preferably mounted in one of the upper corners of shipping container 8 to avoid damage and reduce signal blockage by contents 9 of container 2. Because sides 5 of container 2 are constructed of metal, the microwave pulses bounce around the interior of the container. RGR 8 includes a time of flight range gate that enables measuring reflected microwave signals during a time gate period. The time gate is preferably set for the time it takes a microwave pulse to propagate a maximum distance 10 within container 2 and reflect back to RGR 8. For example, if container 2 is 6.1 meters (20 feet) long, 2.43 meters (8 feet) wide, and 2.43 meters (8 feet tall), maximum distance 10 is about 7.01 meters (23 feet) from the upper corner at one end to the lower corner at the diagonal end. In this example, therefore, 14.02 meters (46 feet) is about the round trip microwave pulse travel distance.

When reflected microwave signals are measured, two measurements are preferably made: First, a DC (direct current) signal level is produced that represents an average reflected signal level within container 2. Second, a Doppler shift measurement is made during the time gate time period that represents motion inside container 2 by any large objects, such as objects larger than a human hand, or by human beings. As a result, any motion within container 2 by any human being, large objects, or doors 3 being opened creates a Doppler shift signal that is detectable when it exceeds a predetermined high threshold. Lower-level vibrations also produce a Doppler shift that is detectable at a lower predetermined threshold. Such vibrations indicate that container 2 is being moved or has been banged, such as during the loading or unloaded process. The above described signals can be used as outputs to a transmitter 11, which communicates with receiver 7 as described in more detail with reference to FIG. 5

Regarding the DC level signal, if any opening, such as opening 4, is created in container 2, or by opening one of doors 3, the DC level immediately shifts because the average reflected signal changes as a function of a signal pattern change. The larger the opening, the larger the DC level shift.

The Doppler shift signal will also detect such an opening being created, the motion of anyone present in container 2, or the addition or removal of any large contents 9 from container 2.

Because signal reflections vary from container to container based on differing container dimensions and contents, RGR 8 develops a relative DC signal level that will probably be different for every container and every shipment. However, any significant change in this DC signal level indicates either a changing of contents 9, or a presence of some opening in container 2. The Doppler shift signal remains constant unless motion occurs. With motion, an AC (alternating current) signal is produced that represents the speed of the motion, which may include audio or infrasonic frequencies. Activities occurring outside container 2 will not typically affect the DC or Doppler shift signals because virtually all the microwave pulse reflections stay within container 2 unless an opening has been created.

Employing microwave pulses is beneficial because they can transmit through non-metal objects and reflect off of and around metal objects. Therefore, unless a metal object shields RGR 8, the microwave pulses will propagate throughout the interior of container 2.

Therefore, employing microwave energy for sensing is superior to other methods, such as merely sensing door openings, because changes in the container walls and contents can be detected. Moreover, dirt, temperature extremes, humidity, physical shock, and contents blocking the microwave pulses will not prevent RGR 8 from working. As a precaution, RGR 8 can be enclosed in a plastic housing and/or potted to seal it against temperature, humidity, and physical shock.

Security system 1 may be further improved by employing a switch 12, such as a mechanical switch, magnetic reed switch, or optical sensor for detecting whether either of doors 3 are open or closed. The status of doors 3 adds additional information for confirming whether a breach is detected or is due to a valid opening of doors 3. Switch 12 can also be employed to determine how long doors 3 remain open. Switch 12 preferably sends its door status information to transmitter 11 for communication to receiver 7 along with the DC and AC signal data from RGR 8.

RGR 8 based on a range gated radar sensor described in U.S. Pat. No. 6,239,736 for RANGE-GATED RADAR MOTION DETECTOR, which is assigned to SLC Technologies and now owned by the assignee of this application. The preferred embodiment of this invention includes modifications for detecting stationary as well as moving objects.

Figure 2:
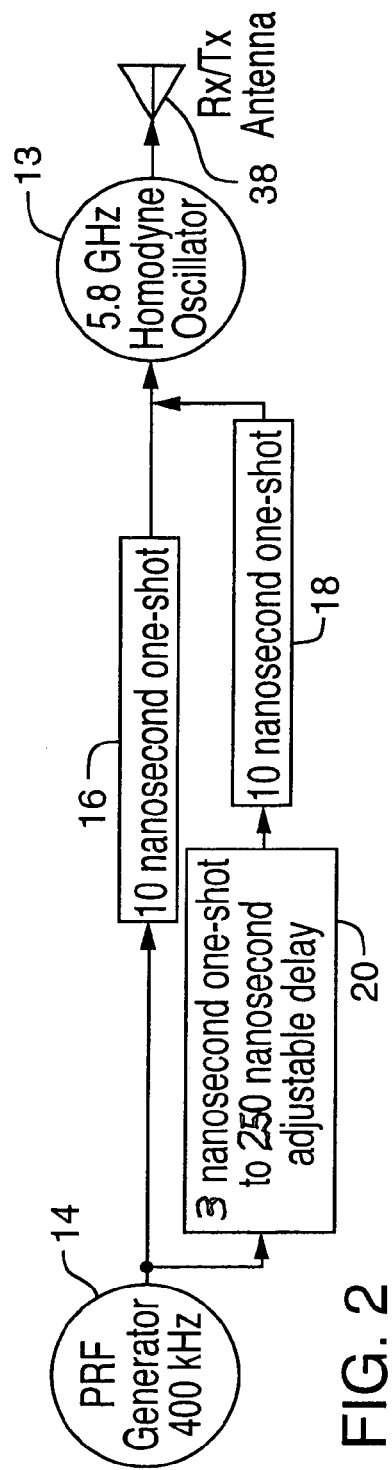
FIG. 2 is a functional block diagram of a range-gated radar transmitter employed in a motion detector of this invention.
Figure 3:
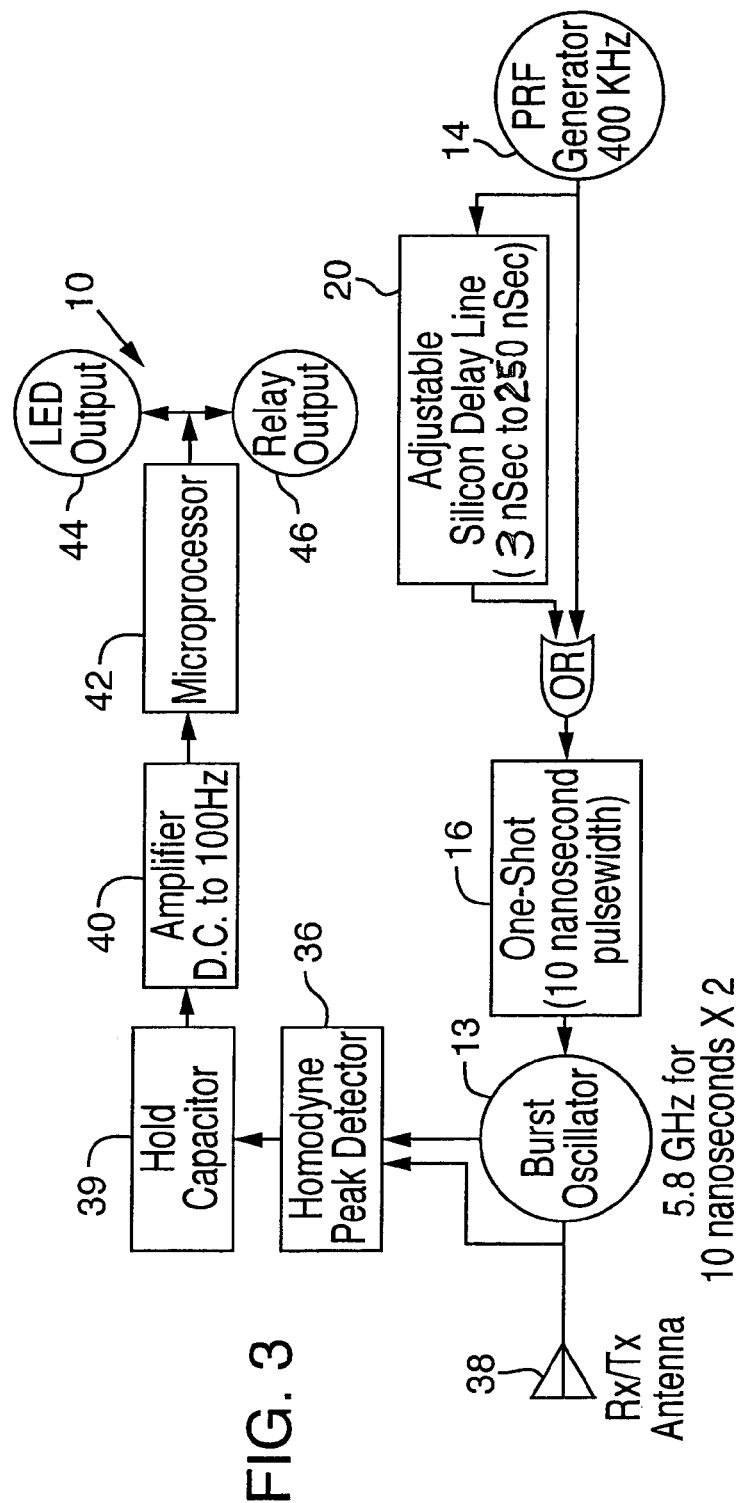
FIG. 3 is a functional block diagram of a range-gated radar transceiver and signal processor employed in the motion detector of this invention.

In particular, FIGS. 2 and 3 show that RGR 8 employs a pulse transmitter 13 that emits 10 nsec, 5.8 GHz microwave transmit pulses at a pulse repetition frequency ("PRF") in a range from 50 to 500 kHz (preferably 400 KHz) in response to a PRF generator 14 and a 10-nsec monostable multivibrator ("one-shot") 16. The pulses are retriggered by subsequent pulses produced by a 10-nsec one-shot 18 in response to an adjustable 10 to 100 nanosecond delay circuit 20 to generate 10-nsec local-oscillator pulses. The duration of each triggered pulse is 3 to 20 nanoseconds (preferably 10 nanoseconds) with a half-sine envelope shape. The PRF generator is derived from a 10 MHZ microprocessor system clock (not shown).

Figure 4:
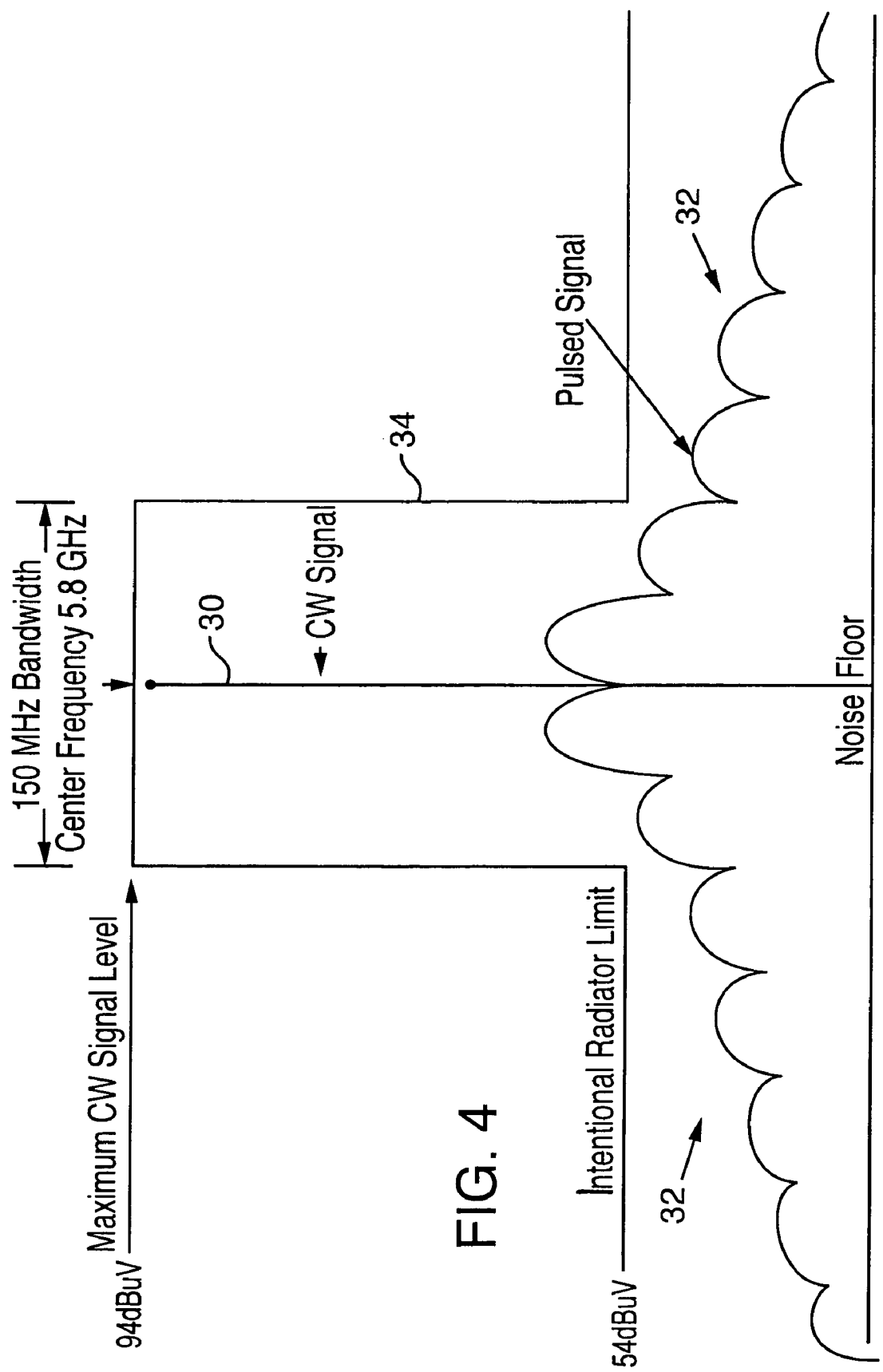
FIG. 4 graphically represents a measured radio-frequency spectrum of the transmitter of FIG. 2 overlayed on the FCC regulatory limits for intentional radiators set forth in 27 CFR §§15.209 and 249.

RGR 8 generates radio-frequency pulses including bursts of less than about 50 cycles of microwave energy. FIG. 4 shows that the average power of a carrier 30 and sidebands 32 of the bursts fall within FCC regulatory limits 34 set forth in 47 CFR §15.209 (1999). Accordingly, the FCC has granted approval of products incorporating RGR 8 under 47 CFR §15.249 (1999), which sets forth the frequency bands for intentional radiators. RGR 8 preferably operates in the third band. Field strength limits are also specified as 50 mV/M (94 dBµV) within the band at a distance of 3 meters and 500 µV/M (54 dBµV) outside the band at a distance of 3 meters. If the transmitted pulses have less than a 1% duty factor, the limits are 20 db higher. (47 CFR §15.249(c) sets forth that radiated emissions outside the allotted frequency bands shall be attenuated by at least 50 dB below the fundamental frequency or to the general radiated emission limits set forth in 47 CFR §15.209, whichever is the lesser attenuation. The general radiation limit specified set forth in 47 CFR §15.209 for frequencies above 960 MHZ is 500 µV/m.

Referring again to FIGS. 2 and 3, the receiver in RGR 8 employs a homodyne peak detector 36 and shares an antenna 38 with pulse transmitter 13. Antenna 38 is preferably a vertically polarized dipole antenna fabricated on a printed circuit board to precisely position the radiating elements above a ground plane and provide an economical way of controlling critical dimensions of antenna 38. This antenna configuration provides a radiation pattern having a uniform response required for accurate target size determination.

The receiver range is determined by adjustable 10 to 100 nanosecond delay circuit 20, which causes mixing of the transmitted pulse with the adjustably delayed local-oscillator pulse, which is also transmitted but with its reflections ignored. Because the pulses propagate through air at about 30.48 centimeters (one foot) per nsec, each 10 nsec pulse spans a 3.04 meter (10 foot) one-way range, or 1.52 meters (five feet) for two-way propagation. Adjustable 10 to 100 nanosecond delay circuit 20 is preferably settable to separate delays for detecting objects within predetermined container sizes, such as 6.1 meter (20 foot) and 12.2 meter (40 foot) containers. For example, for a 6.1 meter (20 foot) container, delay circuit 20 is preferably set to about 46 nsec, and for a 12.2 meter (40 foot) container, delay circuit 20 is preferably set to about 92 nsec.

Figure 5:
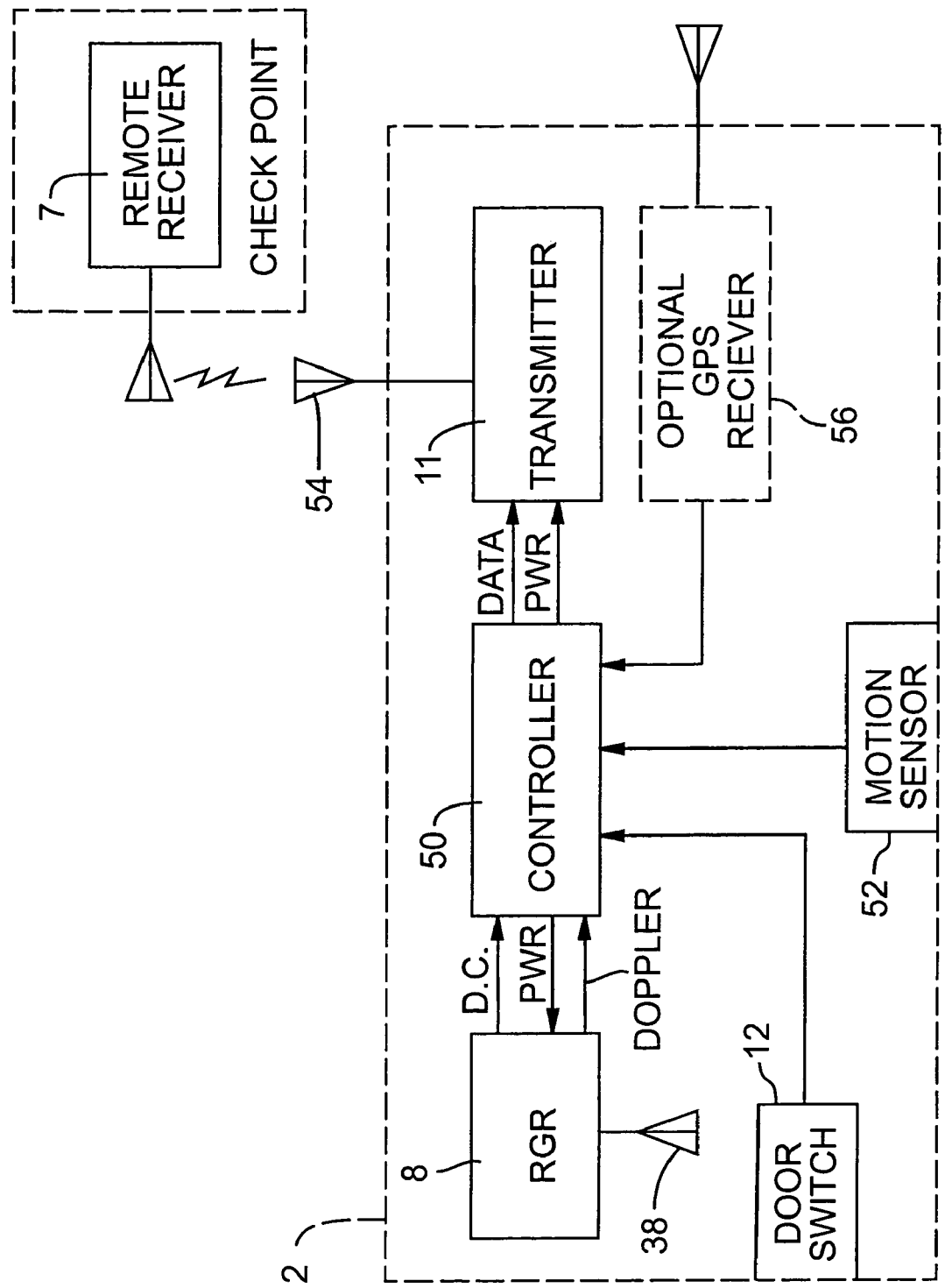
FIG. 5 is a functional block diagram of the overall shipping container security system of this invention.

Each reflected transmit pulse is mixed with its associated delayed local-oscillator pulse by homodyne peak detector 36 that generates a baseband signal. Stationary objects reflect the same frequency as the second pulse and are, therefore, mixed down to a zero frequency, whereas: moving objects reflect a Doppler shifted frequency and are, therefore, mixed down to an audio frequency that depends on a rate of object motion. The detected baseband signal is stored on a hold capacitor 39, reconstructed, amplified, processed, and low-pass filtered by an active filter/amplifier 40 having a cutoff frequency of about 100 Hz. A microprocessor 42 determines whether the processed signal has a predetermined characteristic and exceeds a predetermined threshold. If it does, an alarm condition is indicated by a light-emitting diode, a relay 46, or some other form of signal conveyed to transmitter 11 (FIGS. 1 and 5). The detection threshold is programmable in microprocessor 42 as a function of range and may be set to discriminate object sizes. Verification of a valid alarm condition may be required through several repetitions of a signal of appropriate amplitude with or without alternating polarity.

Referring to FIG. 5, the components of security system 1 are preferably battery powered and further include techniques for significantly reducing current consumption, thereby increasing battery life. A technique for reducing current consumption entails employing a controller 50 to operate security system 1 with a pulsed duty cycle that activates RGR 8 for a first (short) time period sufficient to measure the DC level and/or Doppler shift signals detected in the reflected microwave energy. If no significant signal change is detected, then controller 50 deactivates RGR 8 or places it in a low-current standby mode. After a second (relatively long) time period, controller 50 reactivates RGR 8 to make another measurement. If a significant signal change exceeding a threshold is detected, then RGR 8 stays activated for a third (predetermined) time period sufficient for making multiple measurements of the DC level and/or Doppler shift signals. Skilled workers will understand that controller 50 may be a standalone component or have its functionality integrated in, or preferably shared by, the microprocessors of RGR 8 and transmitter 11.

The first pulsed duty cycle technique reduces the current consumption significantly. For example, if in continuous operation RGR 8 draws 1.0 milliamp, the first time period is 25 milliseconds, and the second time period is 1.25 seconds, RGR 8 could operate longer than five years on a single 3.0 volt Lithium 2/3A cell.

Another technique further reduces current consumption when employing the above-described technique by employing a low-cost sensor to activate RGR 8 whenever significant motion of container 2 is detected. A simple vibration or motion sensor 52 can indicate that a human being is trying to breach container 2 or that container 2 is being moved. When employing this technique, controller 50 places RGR 8 in the deactivated mode or the low-current standby mode. When motion sensor 52 detects motion, RGR 8 is activated for the first time period to sense whether the DC level and/or Doppler shift signals exceed a threshold level. If no change is detected, or after changes have stopped, RGR 8 returns to the deactivated or low-current standby mode.

Yet another technique for reducing current consumption is applied to the system of wirelessly reporting security data to remote receiver 7. Prior workers have also employed receivers in container security systems to listen for interrogation signals that checkpoint transmitters emit to request data reports for checkpoint readers, such as receiver 7. Such security system receivers must be activated either continuously or at frequent regular intervals to ensure that the interrogation signals are received by the container security system. The checkpoint confirms whether the data are received correctly by transmitting an acknowledgement signal back to the container security system receiver. The receiver must receive this acknowledgement to conclude the data reporting cycle. A problem with this prior system is that the security system receivers draw significant amounts of current, which makes it difficult to achieve long battery life. Moreover, the receiver also adds cost to the container security system.

Therefore, this invention eliminates the security system receiver in container 2 and employs only a transmitter, such as transmitter 11 that transmits a repetitious pattern of low duty cycle data transmissions, and/or a pattern of data transmission that are triggered by motion sensor 52 or door switch 12. Transmitter 11 is based on a commercially available transmitter employed in home and industrial security systems that regularly transmits supervisory messages, such as every hour or every four hours. Transmitter 11 can operate longer than five years on a single 3-volt Lithium 2/3A cell. Transmitter 11 is preferably a model number 60-917-95, and receiver 7 is preferably a model number 60-764-01-95R-MAX, both of which are manufactured by GE-Interlogix located in North Saint Paul, Minn. Transmitter 11 resists tampering by employing an antenna 54 that is hidden and protected in a corrugated strengthening "slot" on the exterior of container 2. The antenna is preferably a "Plastenna" model manufactured by Integral Technologies, Inc. located in Bellingham, Wash.

In this invention, transmitter 11 is modified as follows. Rather than sending supervisory messages, the portion of controller 50 in transmitter 11 is modified to send repetitious data reports including the total number of container intrusions, a time stamp representing the current time of the data report, and relative time stamps of prior intrusions. These data are repeatedly transmitted because transmitter 11 cannot determine when remote receiver 7 is activated. The intrusion information is provided by RGR 8, and optionally by door switch 12. Any intrusion detected increments a total intrusions counter associated with the portion of controller 50 in transmitter 11. Controller 50 also includes a memory of at least the last few, and preferably last five, intrusion time stamps. The intrusion time stamps are preferably relative measures of the elapsed time, which eliminates the need for a costly precision time clock in security system 1.

Employing motion sensor 52 to trigger transmissions enables transmitter 11 to communicate more often once motion has been detected. For example, after container 2 has been taken off a ship, truck, or airplane, controller 50 causes transmitter 11 to start transmitting data every ten minutes and send multiple repetitions of the data during each transmission period to ensure that receiver 7 receives the data. Repeating the data transmissions helps ensure data reception when hundreds of other containers in the same area are also transmitting data, and potentially causing data collisions.

Receiver 7 further compares the data received from security system 1 at a current time of measurement to data received at a time of shipping. The shipping time is known because checkpoints worldwide are preferably interlinked over a global network of security servers. Moreover, if the total number of intrusions has not changed, then the integrity of container 2 has been maintained. If the total number of intrusions has increased, then prior time stamps, preferably the last five, can be read. To accurately determine the time of the last five time stamps, the relative time stamps need to be converted into actual time by comparing the time stamp at the time of shipping to the time, stamp of the current measurement. These two time stamps differ in a number of counts by an amount that can be divided by the actual time elapsed between the shipping and current reports to determined the actual time represented by each count.

Another time stamp determination method is described by way of an example. Assume the time stamp reported when container 2 is shipped from France is 000103569, and the actual time of this reading is known by a controller at the French checkpoint. If container 2 arrives in Los Angeles 24 hours later, and the new time stamp measured at the LA checkpoint is 000105009, then the difference between these the two time stamps is 1440. This difference indicates that about 1440 minutes (or 24 hours) have elapsed between the two time stamps, which is accurate to within a few minutes per month. Therefore, when an actual time of a received data transmission can be compared to its associated time stamp, the time stamp can be converted to actual minutes. When this is known, all of the previous time stamps, such as for the last five intrusions, can also be converted to actual time that is accurate to within a few minutes per month.

Another benefit of intrusion time stamps is automatic verification that intrusion sensing capability has not been defeated. Whenever container 2 is opened, if the total intrusion counter does not register an incremental count, then the intrusion sensing capability has either failed or been intentionally defeated.

The functionality of security system 1 can be expanded by adding an optional global positioning system ("GPS") receiver 56 for associating location information with the intrusion time stamps and reporting this data from transmitter 11 to receiver 7. Because the checkpoint location of remote receiver 7 is known, the controller associated with receiver 7 can use the current GPS location of container 2 to verify the locating accuracy of GPS receiver 56. When adding GPS receiver 56, current consumption can be reduced by activating GPS receiver 56 only after an intrusion or motion or container 2 has been detected. Suitable GPS location tracking components are described in U.S. Pat. No. 5,491,486 for MOBILE TRACKING UNITS EMPLOYING MOTION SENSORS FOR REDUCING POWER CONSUMPTION THEREIN, which is assigned to the assignee **(GE) of this application.

Security system 1 can further optionally include a long-range wireless modem (optionally in place of transmitter 11) for conveying data reports via satellite, cellular radio channels, two-way pager networks, or other regional or global wireless networks. Whenever an intrusion is detected, the time stamp and GPS location information can be reported immediately via the wireless modem. If container 2 is not within reception range of a wireless network, for example when it is in the hold of a ship at sea, on a truck outside a cellular network, or in the hold of an airplane, then security system 1 stores the data for transmission when contact with the wireless network is re-established.

All of the functions described above for transmitter 11 are assumed by the long-range wireless network modem. Therefore, when security system 1 includes a long-range wireless network modem, transmitter 11 may optionally be eliminated.

Skilled workers will recognize that portions of this invention may be implemented differently from the implementations described above for preferred embodiments. For example, containers other than large shipping containers can be protected by this invention, such as ship, truck, and aircraft cargo holds. Solar cells may be employed to recharge batteries, and low-battery data may be transmitted to checkpoints. To mitigate exterior antenna tampering, a redundant antenna may be employed inside the container for transmitting data reports when a door is opened. Moreover, a dummy decoy antenna may be rigged as a tamper switch.
**(Inventors, what other alternatives are worth describing?)

It will be obvious to those having skill in the art that many changes may be made to the details of the above-described embodiments without departing from the underlying principles of the invention. The scope of the present invention should, therefore, be determined only by the following claims.

We claim:

1. A container security system, comprising:
   a micro-impulse radar positioned inside the container for transmitting microwave signals and receiving reflections of microwave signals; and
   a detector operative during a predetermined time period for generating a first signal indicative of an average energy level of the reflections of the signals during the predetermined time period and for generating a second signal indicative of a Doppler shift occurring between the microwave signals and the reflections of the microwave signals during the predetermined time period.

2. The system of claim 1, in which the predetermined time period includes a time required for the emitted microwave signals to propagate from the micro-impulse radar to a most distant point within the container and return to the detector.

3. The system of claim 1, in which the container further includes a door and the first signal includes a level shift indicative of at least one of an open, closed, or removed condition of the container door, a hole in the container, and a change in contents of the container.

4. The system of claim 1, in which the container further includes a door and the second signal includes a Doppler shift indicative of at least one of a movement of the container door, creating a hole in the container, moving a contents of the container, a vibration of the container, and a movement by a human being within the container.

5. The system of claim 4, further including a processor for determining an amount of at least one of the first and second signals and producing an alarm condition based on a comparison to the amount.

6. The system of claim 1, further including a transmitter for communicating information to a remote receiver, the information including information associated with at least one of the first and second signals.

7. The system of claim 6, in which the container further includes a door and a sensor for detecting a status of the door, and the information further includes at least one of whether the door is open and a time period when the door is open.

8. The system of claim 6, in which the transmitter includes a long-range, wireless modem.

9. The system of claim 1, in which the microwave signals are pulses of microwave energy at a frequency of 960 MHz or higher and at a pulse repetition frequency ranging from about 50 kHz to about 500 kHz.

10. The system of claim 9, in which the pulses have a duration of about 10 nsec.

11. The system of claim 1, further including at least one battery for powering the system, and a controller that reduces a current consumption of the radar by activating the radar for a first time period and deactivating the radar for a second time period that is longer than the first time period.

12. The system of claim 11, further including a motion sensor mechanically coupled to the container and electrically coupled to the controller for activating the radar in response to a motion of the container.

13. The system of claim 12, in which the controller senses no significant change in the first and second signals and responds by deactivating the radar.

14. The system of claim 12, further including:
   at least one container door having an associated door sensor for determining a status of the door; and
   a transmitter for conveying container intrusion data to a remote receiver, the controller activating the transmitter during a repetitious pattern of low duty cycle time periods or in response a signal generated by at least one of the door sensor, the motion sensor, and the radar.

15. The system of claim 14, in which the controller further includes a time stamp generator and an intrusion counter, and in which the intrusion data includes a total number of container intrusions, a time stamp representing a current time of the intrusion data, and a time stamp for each of a predetermined number of prior intrusions.

16. The system of claim 1, further including a GPS receiver for generating container location information and a transmitter for communicating data to a remote receiver, the data including information associated with at least one of the first signal, the second signal, and the container location information.

17. A method of determining a security of a shipping container, comprising:
   transmitting microwave signals inside the container and receiving reflections of the microwave signals inside the container;
   generating a first signal indicative of an average energy level of the reflections of the signals;
   generating a second signal indicative of a Doppler shift occurring between the microwave signals and the reflections of the microwave signals; and
   processing at least one of the first and second signals to determine whether a container intrusion has occurred.

18. The method of claim 17, further including communicating to a remote checkpoint information associated with at least one of the first and second signals.

19. The method of claim 17, further including activating the transmitting for a first time period and deactivating the transmitting for a second time period that is longer than the first time period.

20. The method of claim 17, further including mechanically coupling a motion sensor to the container and activating the transmitting in response to a motion of the container.

21. The method of claim 20, further including deactivating the transmitting in response to a cessation of the motion of the container.

22. The method of claim 20, in which the container further includes a door and the method further includes sensing a status of the door, and transmitting container intrusion data to a remote checkpoint in response at least one of the door status, the motion, the first signal, and the second signal.

23. The method of claim 22, in which the intrusion data includes a total number of container intrusions, a current time of the intrusion data, and a time of each of a predetermined number of prior intrusions.

24. The method of claim 23, in which the current time and the time of each of the prior intrusions is a relative time.

25. The method of claim 23, further including sensing container global location information and the intrusion data further includes a container global location associated with the intrusion information and with each of the prior intrusions.

* * * * *

UNITED STATES PATENT AND TRADEMARK OFFICE
CERTIFICATE OF CORRECTION

PATENT NO. : 7,019,683 B2 Page 1 of 1
APPLICATION NO. : 10/794764
DATED : March 28, 2006
INVENTOR(S) : Stevens et al.

It is certified that error appears in the above-identified patent and that said Letters Patent is hereby corrected as shown below:

Column 5, line 39, "(47 CFR §15.249(c)" should read -- 47 CFR §15.249(c) --

Column 8, line 2, "time, stamp" should read -- time stamp --

Column 8, line 38, "or" should read -- of --

Column 8, line 42, "**(GE)" should be deleted.

Column 9, line 3, "**(Inventors, what other alternatives are worth describing?)" should be deleted.

Signed and Sealed this

Second Day of October, 2007

JON W. DUDAS
*Director of the United States Patent and Trademark Office*